United States Patent
Yoshimura

(10) Patent No.: US 6,593,717 B2
(45) Date of Patent: Jul. 15, 2003

(54) APPARATUS AND METHOD FOR CONTROLLING COOLING FAN FOR VEHICLE

(75) Inventor: Satoshi Yoshimura, Kariya (JP)

(73) Assignee: Denso Corporation, Kariya (JP)

( * ) Notice: Subject to any disclaimer, the term of this patent is extended or adjusted under 35 U.S.C. 154(b) by 152 days.

(21) Appl. No.: 09/915,259

(22) Filed: Jul. 27, 2001

(65) Prior Publication Data

US 2002/0014873 A1 Feb. 7, 2002

(30) Foreign Application Priority Data

Jul. 28, 2000 (JP) .................................. 2000-229112

(51) Int. Cl.⁷ .............................................. G05D 23/19
(52) U.S. Cl. ...................... 318/471; 318/433; 318/139; 62/133
(58) Field of Search ............................. 318/471, 433, 318/139; 62/133

(56) References Cited

U.S. PATENT DOCUMENTS

| | | | | |
|---|---|---|---|---|
| 4,425,766 A | * | 1/1984 | Claypole | ................... 62/133 |
| 5,561,243 A | * | 10/1996 | Machida | ................... 73/118.1 |
| 5,877,604 A | * | 3/1999 | Kessler | ................... 318/447 |
| 5,977,743 A | * | 11/1999 | Flock | ................... 318/811 |
| 6,016,965 A | * | 1/2000 | Yoshimura et al. | ........... 236/35 |

FOREIGN PATENT DOCUMENTS

| | | |
|---|---|---|
| JP | A-61-46416 | 3/1986 |
| JP | A-10-238345 | 9/1998 |

* cited by examiner

Primary Examiner—Rita Leykin
(74) Attorney, Agent, or Firm—Posz & Bethards, PLC

(57) ABSTRACT

When air passing through a condenser and a radiator passes through a cooling fan in a state where a driving circuit controls a voltage applied to a motor to be constant in accordance with a motor application voltage instructed by a control signal Sa, a motor current Im decreases. A comparator compares the motor current Im with a reference current set on the basis of a motor voltage Vm. When the motor current Im decreases to a value equal to or lower than the reference current, a switching circuit is switched to select an output signal of an operational amplifier. The operational amplifier performs a feedback control so that the motor voltage Vm coincides with a minimum application voltage VL.

12 Claims, 7 Drawing Sheets

APPARATUS AND METHOD FOR CONTROLLING COOLING FAN FOR VEHICLE

CROSS REFERENCE TO RELATED APPLICATION

This application is based upon Japanese Patent Application No. 2000-229112 filed on Jul. 28, 2000, the contents of which are incorporated herein by reference.

BACKGROUND OF THE INVENTION

1. Field of the Invention

The present invention relates to an apparatus and method for controlling a motor-driven cooling fan for a vehicle.

2. Related Art

A vehicle (for example, automobile) is provided with a cooling fan for cooling a radiator of an engine and a condenser of an air conditioner. The cooling fan is conventionally rotated by a motor (for example, DC motor). FIG. 7 schematically shows an electric configuration of a cooling fan control system. A fan control system 1 includes a DC motor 3 for rotating a cooling fan 2 and a motor control unit 4 for controlling a voltage applied to the DC motor 3.

The motor control unit 4 receives a control signal Sa as a motor application voltage instruction from an engine control unit 5, and operates on a power supplied from a battery 6. An input processing circuit 7 is an interface circuit for receiving the control signal Sa, converts the control signal Sa into a voltage instruction signal Sb, and outputs the voltage instruction signal Sb to a driving circuit 8. On the basis of a voltage applied to the motor 3 (motor application voltage) detected by a motor voltage detecting circuit 9 and an instructed voltage indicated by the voltage instruction signal Sb, the driving circuit 8 controls a gate voltage of an MOSFET 10 so that the motor application voltage becomes equal to the instructed voltage.

When the motor 3 is driven by the motor control unit 4 to rotate the cooling fan 2, air is blown. The blown air passes through a condenser 11 and a radiator 12, thereby cooling the condenser 11 and the radiator 12. Since the cooling fan 2, condenser 11, and radiator 12 are disposed in the front portion of the automobile, air flowing (flowing air) in association with the driving of the automobile also passes through the condenser 11 and radiator 12, thereby contributing to the operation of cooling them.

The engine control unit 5 receives an engine cooling water temperature signal, an ON/OFF signal (clutch signal) of a magnet clutch for transmitting the engine power to the compressor of the air conditioner, and a refrigerant high pressure signal indicative of an increase in the pressure of a refrigerant, controls the engine by using the signals, and outputs the control signal Sa to the motor control unit 4. The clutch signal becomes ON state (high level, for example) when the heat exchangeability of an evaporator of the air conditioner decreases. The refrigerant high pressure signal becomes ON state (pressure increased state) when the refrigerant pressure increases to a reference value or more due to insufficient cooling of the condenser 11 or high load operation of the compressor. Alternately, a motor control circuit, which has the function of directly receiving the signals, not via the engine control unit, and generates an application voltage instruction to the DC motor 3 based on the signals, may be used.

FIG. 8A shows the motor application voltage instructed to the motor control unit 4 by the engine control unit 5. The horizontal axis indicates the temperature of engine cooling water and the vertical axis expresses motor application voltage ratio (%). The engine control unit 5 instructs the motor control unit 4 to increase the motor application voltage step by step or at a predetermined rate in accordance with an increase in detected temperature of the engine cooling water.

In the example, when the magnet clutch is turned on so that the compressor is in a driving state, the engine control unit 5 instructs the motor control unit 4 to set the motor application voltage so as to be 50% or more. Further, when the refrigerant high pressure signal becomes ON state, the engine control unit 5 instructs the motor control unit 4 to set the motor application voltage so as to be 70% or more. The value (50%, 70%) of the motor application voltage instructed here varies according to a vehicle.

Generally, the operation of the cooling fan 2 is mostly requested by the air conditioner system. As described above, in the conventional cooling fan control system, when the compressor is driven, the application voltage of at least 50% is applied to the DC motor 3. Consequently, the compressor and the cooling fan 2 operate almost synchronously with each other as shown in FIG. 8B.

However, during the driving of the automobile, air flows through the condenser 11 and radiator 12. The flowing air also contributes to cool the compressor and the radiator. Even in such a case, conventionally, the DC motor 3 is driven according to the control pattern shown in FIG. 8A without considering the air flow. As a result, the power of the battery 6 is consumed in vain.

SUMMARY OF THE INVENTION

The invention has been achieved in consideration of the circumstances and its object is to provide an apparatus and method for controlling a motor-driven cooling fan for a vehicle, with reduced power consumption of the motor while assuring a necessary cooling air.

According to a first aspect of the invention, in a state where the voltage applied to a motor is controlled to be a predetermined voltage by which an air volume required for cooling is obtained, control means detects a current flowing the motor. The current flowing the motor is reduced when a load on the motor decreases, that is, when the flowing air is given to a cooling fan for vehicle as a vehicle travels for the reason that the flowing air contributes to the cooling.

Consequently, when the decrease in the current flowing the motor is detected, the control means sets the voltage applied to the motor so as to be lower than the predetermined voltage by an amount corresponding to the cooling capability by the flowing air and controls so that the required cooling air volume is assured as a total of the cooling air generated by the cooling fan and the flowing air. As a result, the power required to assure the required cooling air volume can be reduced. For example, the power of a battery mounted on the vehicle can be saved.

According to a second aspect of the invention, when it is detected that the current flowing the motor is lower than a current flowing the motor at the time of vehicle stop by a predetermined amount in a state where the voltage applied to the motor is controlled to be a predetermined voltage, the control means changes the application voltage. With the configuration, for example, the voltage is changed after the vehicle travels and the flowing air by which the power saving of a certain degree can be expected is obtained. Thus, the voltage applied to the motor can be prevented from being controlled to be excessively low.

According to a third aspect of the invention, by detecting a decrease in the current flowing the motor, the control means detects whether the flowing air at the required cooling air volume or higher is obtained. When the flowing air has the required cooling air volume or more, the control means changes the application voltage. In this case, the necessary cooling can be achieved only by the flowing air, so that the control means can stop the passage of current to the motor.

According to a fourth aspect of the invention, when the application voltage is changed, the control means sets the voltage applied to the motor to a voltage with which the motor can rotate. When the voltage applied to the motor is low and the motor does not rotate, a fluctuation in the load by the current flowing the motor (change in the air volume) cannot be detected. With the configuration, the motor continuously rotates, so that the control can detect the state of the flowing air also after the application voltage is changed and can change the application voltage as necessary.

According to a fifth aspect of the invention, by detecting an increase in the current flowing the motor in a state where the voltage applied to the motor is controlled to be the predetermined voltage, the control means detects that the load on the motor increases, that is, the flowing air passing through the cooling fan for a vehicle decreases. When the increase in the current flowing the motor is detected, the control means makes the voltage applied to the motor higher by an amount corresponding to the decrease in the flowing air, and controls so that the required air volume is assured as a total of the cooling air generated by the cooling fan and the flowing air.

Consequently, in an actual operating state where the vehicle repeatedly stops and travels, not only in the case where the flowing air increases but also in the case where the flowing air decreases, the motor power consumption is reduced by using the flowing air according to the operating state.

According to a sixth aspect of the invention, current change detecting means outputs a current decrease signal when the current flowing the motor becomes lower than a threshold value, that is, when the air volume of the flowing air larger than the air volume corresponding to the threshold value passes through the cooling fan so that the load on the motor decreases. The voltage control means decreases an instruction voltage when the current decrease signal is output, and controls the voltage applying means so that the voltage applied to the motor coincides with the instruction voltage.

When the air volume of the flowing air passing through the cooling fan becomes equal to or lower than the air volume corresponding to the threshold value, the current decrease signal is not output. The voltage control means uses a predetermined voltage applied from an outside as an instruction voltage and controls the voltage applying means so that the voltage applied to the motor coincides with the instruction voltage. As a result, as compared with the conventional configuration in which the motor is rotated on the constant voltage irrespective of the flowing air, the power consumption of the motor can be reduced.

According to a seventh aspect of the invention, in a manner similar to the means in the third aspect, the voltage control means decreases the instruction voltage in the case where the required air volume can be assured by the flowing air. In this case, the voltage control means can set the instruction voltage to zero, that is, can stop the passage of the current to the motor.

, features and advantages of the present invention will become more apparent from the following detailed description made with reference to the accompanying drawings.

DETAILED DESCRIPTION OF THE PREFERRED EMBODIMENT

An embodiment of the invention will be described hereinafter with reference to FIGS. 1 to 6.

Figure 1:
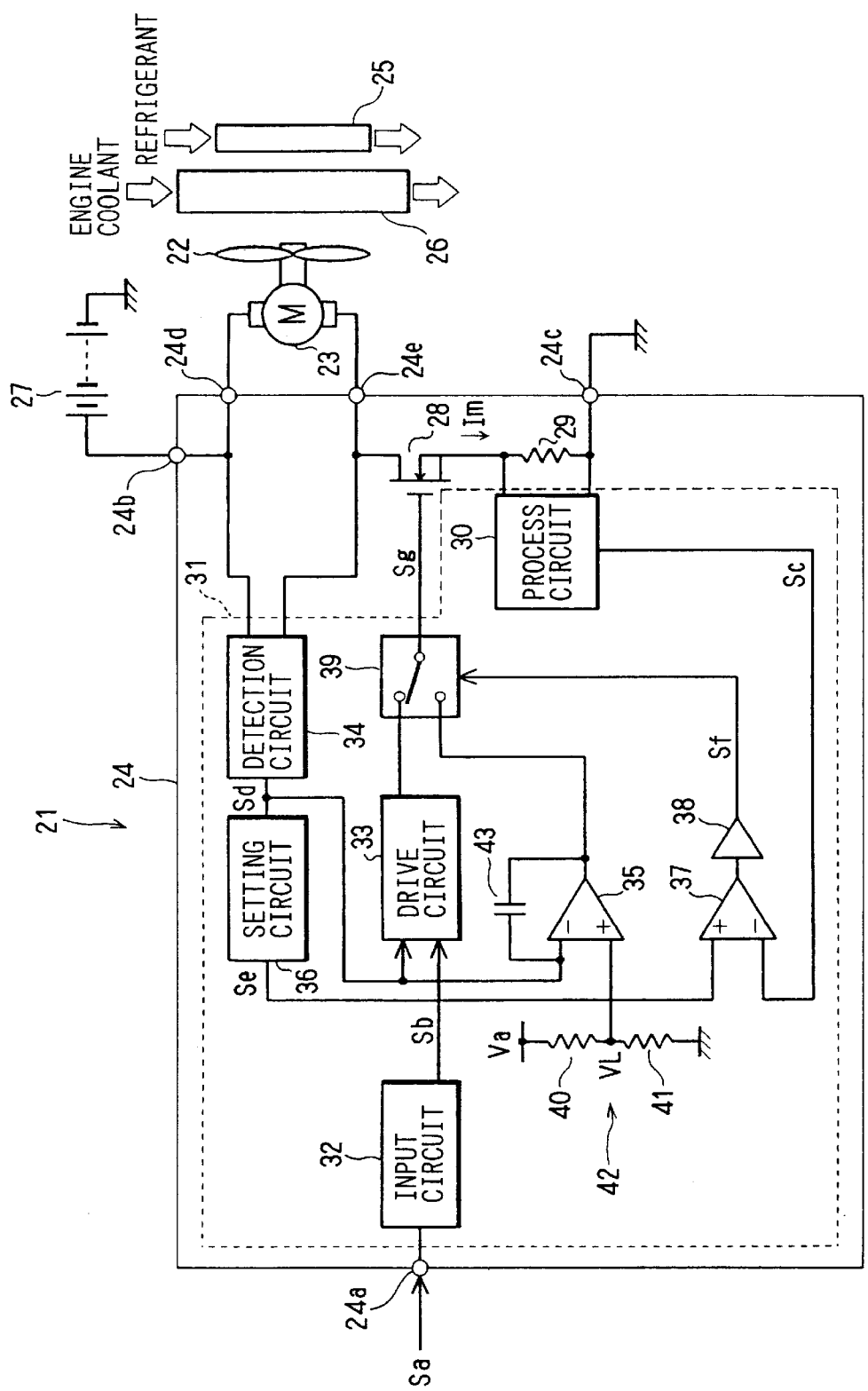
FIG. 1 is a diagram showing an electrical configuration of a fan control system according to an embodiment of the invention.

FIG. 1 shows the electrical configuration of a fan control system used for a vehicle (automobile in this case). In FIG. 1, a fan control system 21 includes a DC motor 23 for rotating a cooling fan 22 (cooling fan for a vehicle) and a motor control unit 24 (control means) for controlling a voltage applied to the DC motor 23.

The cooling fan 22 is to cool a condenser 25 through which a refrigerant of an air conditioner for vehicle passes and a radiator 26 through which engine cooling water passes. The condenser 25, radiator 26, and cooling fan 22 are disposed in the front portion of the automobile. When the vehicle travels and receives air (flowing air), the flowing air passes through the condenser 25 and radiator 26 to thereby cool them. After that, the air passes through the cooling fan 22.

Figure 7:
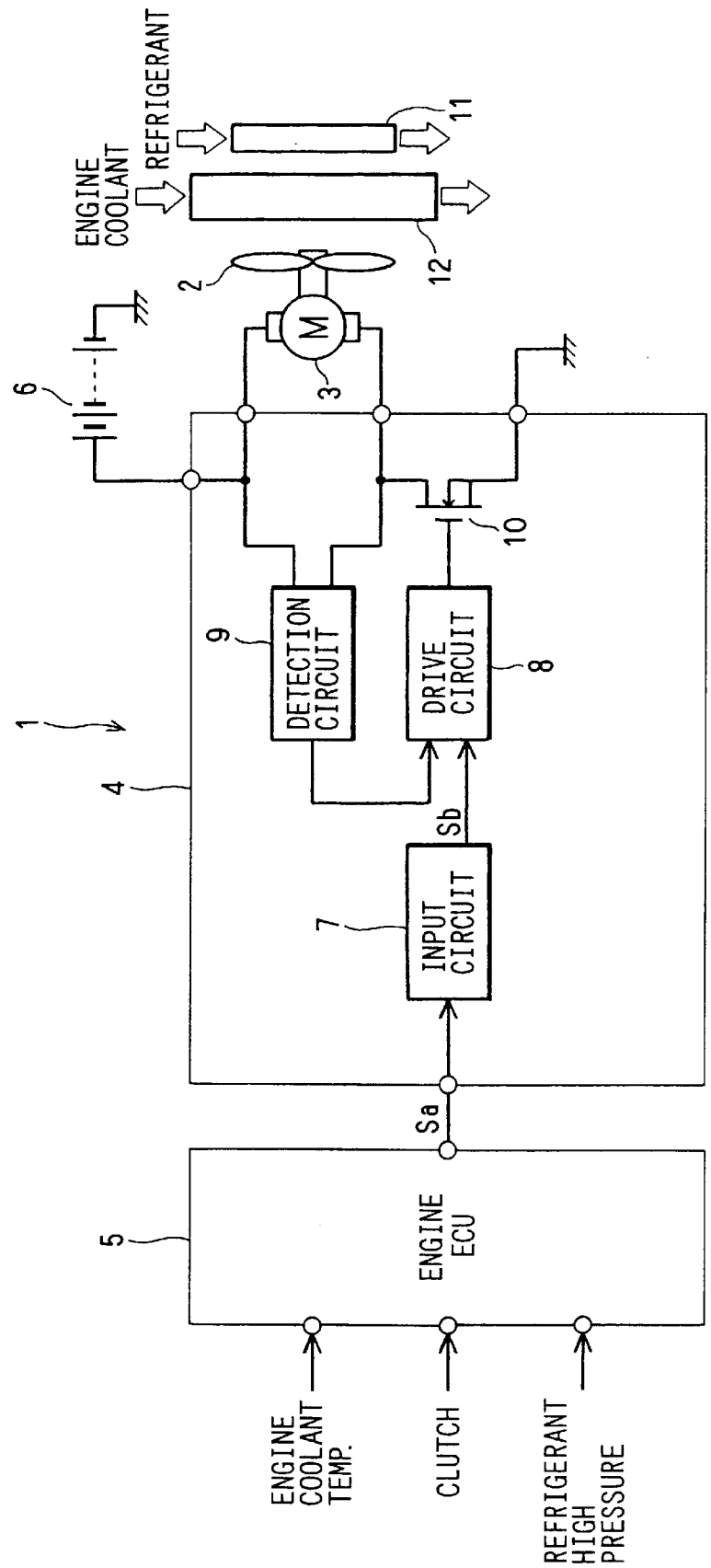
FIG. 7 is a diagram showing the electrical configuration of a conventional cooling fan control system.
Figure 8A:
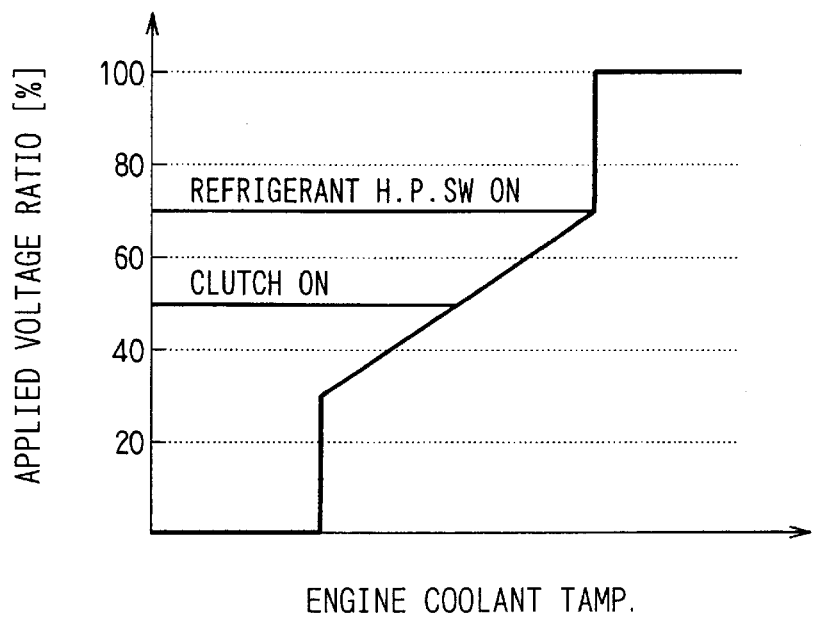
FIG. 8A is a diagram showing motor application voltage ratio with respect to an engine cooling water temperature, a clutch signal, and a refrigerant high pressure signal.
Figure 8B:
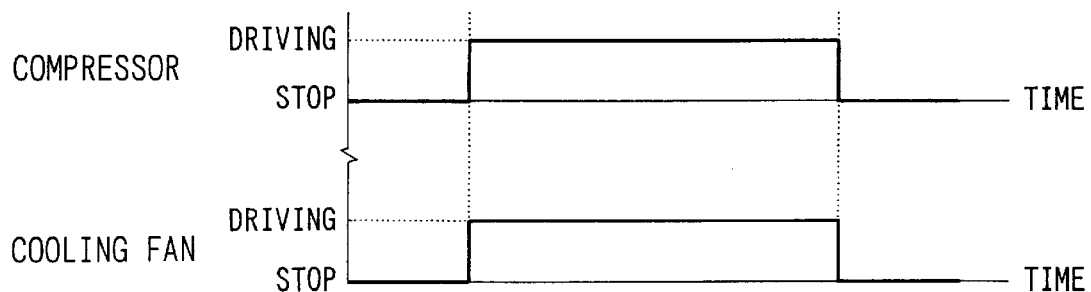
FIG. 8B is a diagram showing states of a compressor and a cooling fan.

A control signal Sa for instructing a motor application voltage is supplied from an engine control unit (not shown) to an input terminal 24a of the motor control unit 24. The engine control unit instructs the motor application voltage in accordance with, for example, the control pattern of FIG. 8A shown in the related art. The motor control unit 24 of the embodiment can be therefore employed to the conventional fan control system instead of the motor control unit 4 (refer to FIG. 7) having the conventional configuration.

Power source terminals 24b and 24c of the motor control unit 24 are connected to a positive terminal and a negative terminal (earth terminal), respectively, of a battery 27 mounted on the vehicle. Output terminals 24d and 24e are connected to the positive and negative terminals of the DC motor 23, respectively. In the motor control unit 24, the output terminal 24d is connected to the power source terminal 24b, and the output terminal 24e is connected to the power source terminal 24c via the drain and source of an N-channel type MOSFET 28 (voltage applying means) and a resistor 29 for current detection.

In the motor control unit 24, the components other than the above circuits are constructed as an IC 31 (Integrated Circuit) for control. The IC 31 operates on a control power voltage Vs supplied from a not-shown control power source. The configuration of the IC 31 will now be described.

A detection voltage processing circuit 30 is a circuit for detecting a current Im flowing the DC motor 23 (hereinafter, motor current Im) on the basis of a voltage generated at the resistor 29, and outputting a current detection signal Sc indicative of the detected motor current Im. The resistor 29 and the detection voltage processing circuit 30 correspond to current detecting means in the invention.

An input processing circuit 32 is an interface circuit for receiving the control signal Sa, converting the control signal Sa to a voltage instruction signal Sb, and outputting the voltage instruction signal Sb to a driving circuit 33.

A motor voltage detecting circuit 34 (voltage detecting means) detects a voltage Vm between the output terminals 24d and 24e of the DC motor 23 (hereinafter, called a motor voltage Vm) and outputs it as a voltage detection signal Sd to the driving circuit 33 and an operational amplifier 35. A reference current setting circuit 36 sets a reference current (threshold) which will be described hereinafter on the basis of the motor voltage Vm indicated by the voltage detection signal Sd and outputs it as a reference current signal Se to a comparator 37.

The comparator 37 (current change detecting means) compares the current detection signal Sc indicative of the motor current Im supplied to an inversion input terminal with the reference current signal Se indicative of a reference current to be supplied to a non-inversion input terminal, and outputs a switching signal Sf having H or L level (current decrease signal). The switching signal Sf is supplied to a switching circuit 39 via a delay circuit 38.

When the switching signal Sf is at the L level, the switching circuit 39 selects an output signal of the driving circuit 33. When the switching signal Sf is at the H level, the switching circuit 39 selects an output signal of the operational amplifier 35 and supplies the selected output signal as a drive signal Sg to the gate of the MOSFET 28.

The delay circuit 38 is used for the following reason. When the control signal Sa indicative of the motor application voltage instruction decreases step by step, the DC motor 23 temporarily enters a power generating state, the motor current Im decreases, and the comparator 37 temporarily outputs the switching signal Sf of the H level. In the configuration of directly supplying the switching signal Sf to the switching circuit 39, the switching circuit 39 is switched also by the temporary change, and an erroneous operation occurs. Consequently, by delaying the switching signal Sf by the delay circuit 38 until the temporary decrease of the motor current Im converges (for example, time of about 0.5 second set on the basis of the time constant of the DC motor 23), the erroneous operation is prevented from occurring.

The driving circuit 33 includes a subtractor for calculating a difference between the voltage instruction signal Sb and the voltage detection signal Sd, and a PI control unit to which a deviation from the voltage instruction signal Sb is input. When the output signal of the driving circuit 33 is selected as a drive signal Sg, feedback control is performed so that the motor voltage Vm (voltage detection signal Sd) coincides with the instructed motor application voltage (voltage instruction signal Sb).

A series circuit 42 having resistors 40 and 41 is a circuit for dividing a control source voltage Vs to generate a minimum application voltage VL to the DC motor 23. The minimum application voltage VL and the motor voltage Vm as the voltage detection signal Sd are supplied to the non-inversion input terminal and inversion input terminal, respectively, of the operational amplifier 35. A capacitor 43 is connected between the non-inversion input terminal and the output terminal of the operational amplifier 35, and the operational amplifier 35 functions as an I control unit (integrator).

When the output signal of the operational amplifier 35 is selected as the drive signal Sd, feedback control is performed so that the motor voltage Vm coincides with the minimum application voltage VL. The minimum application voltage VL is set to a voltage value as low as possible without stopping the DC motor 23. That is, the voltage value is almost the lowest value by which the DC motor 23 can be driven. The driving circuit 33, operational amplifier 35 to which the capacitor 43 is connected, series circuit 42, and switching circuit 39 correspond to voltage control means in the invention.

The operation of the fan control system 21 will now be described by referring to FIGS. 2 to 6. First, as described in "Related Art", the engine control unit determines an air volume of cooling air necessary to cool the condenser 25 and the radiator 26 on the basis of the engine cooling water temperature signal, clutch signal indicative of the operating state of the compressor of the air conditioner, and refrigerant high pressure signal of the air conditioner, and outputs the control signal Sa indicative of the motor application voltage necessary for the cooling fan 22 to generate the required air volume of cooling air to the motor control unit 24.

Figure 2A:
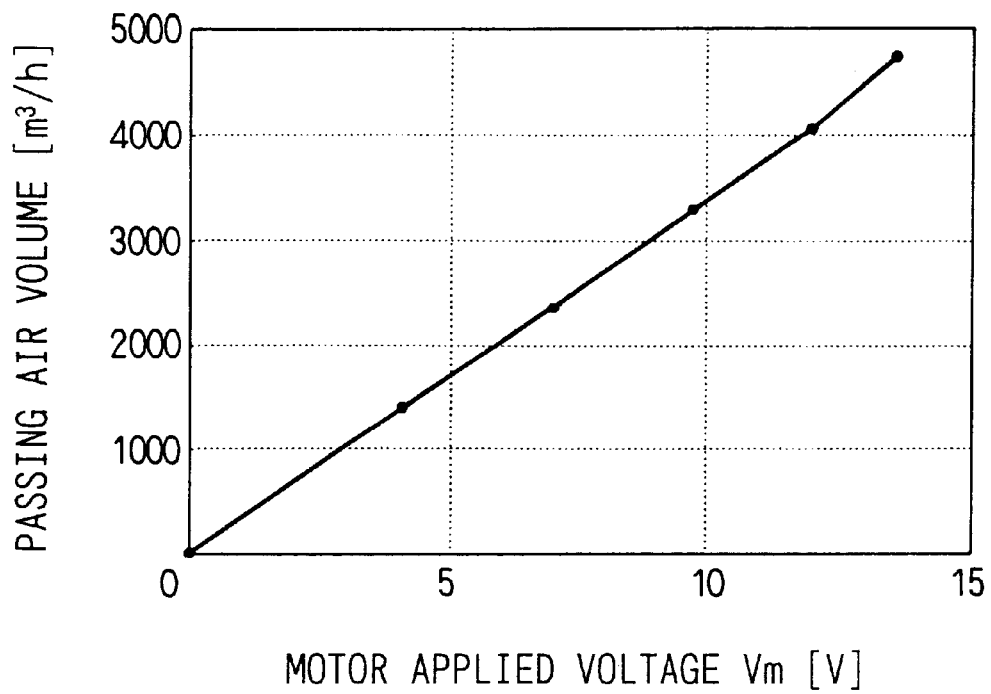
FIG. 2A is a graph showing relation between motor application voltage Vm and volume of air passed.
Figure 2B:
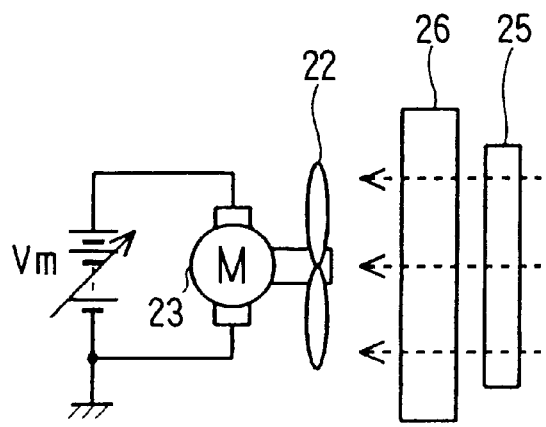
FIG. 2B is a diagram showing a measurement system.

FIG. 2A is a characteristic diagram showing the relation between the motor application voltage Vm and the air volume of air passing the condenser 25 and radiator 26 (hereinafter, simply called passing air volume) in a measurement system shown in FIG. 2B. The engine control unit obtains the motor application voltage according to the required air volume on the basis of the characteristic. As an example, when the passing air volume of 2500 $m^3/h$ is necessary to cool the condenser 25 and radiator 26, the engine control unit outputs the control signal Sa for instructing the motor application voltage of 6.85V to the motor control unit 24.

When the vehicle stops, the air passing through the condenser 25 and radiator 26 is generated only by the rotation of the cooling fan 22. In contrast, when the vehicle travels, in addition to the cooling air generated by the rotation of the cooling fan 22, flowing air is added to cool the condenser 25 and the radiator 26. As described above, the flowing air passes through the condenser 25 and radiator 26, thereby contributing to cool the condenser 25 and radiator 26. When the air volume of flowing air becomes equal to or higher than the required cooling air volume, the condenser 25 and radiator 26 can be cooled only by the flowing air without rotating the cooling fan 22.

The flowing air contributing to the cooling passes through the cooling fan 22 and acts to rotate the cooling fan 22 faster (power generating action). The power necessary to rotate the cooling fan 22 decreases according to increase of the air volume of the flowing air, whereby the motor current Im, which flows when the motor control unit 24 drives the DC motor 23, decreases. The motor control unit 24 of the embodiment indirectly detects the air volume of the flowing air by using this principle. Referring to FIG. 3, it will be specifically described.

Figure 3A:
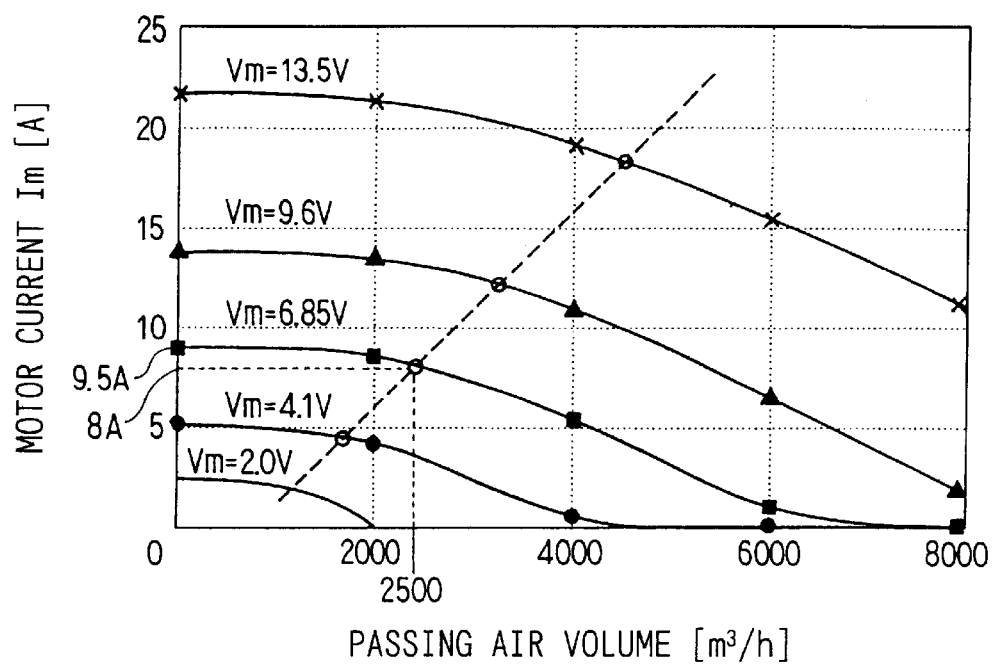
FIG. 3A is a graph showing relation between the volume of air passed and motor current Im under the condition that motor application voltage Vm is controlled to be constant.
Figure 3B:
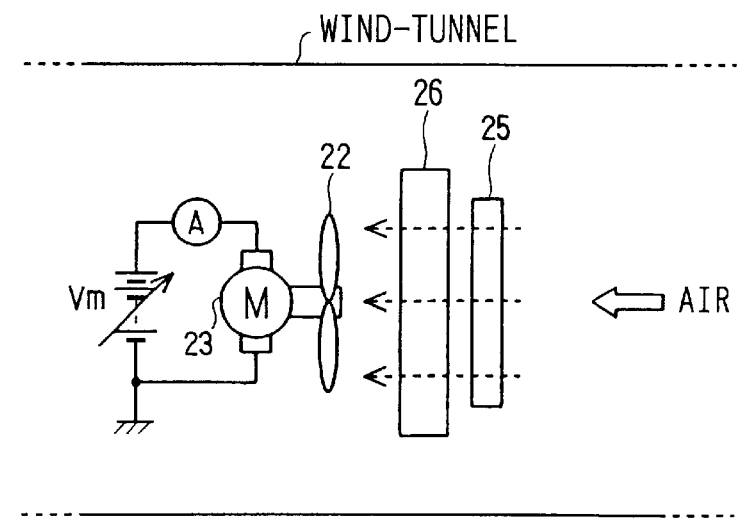
FIG. 3B is a diagram showing an experiment system.

FIG. 3A is a characteristic diagram showing relation between the air volume of air passing through the condenser 25 and radiator 26 under the condition that the motor application voltage Vm is controlled to be constant in a wind tunnel test shown in FIG. 3B and the motor current Im. In the wind tunnel test, an actual driving state is assumed and wind is forcedly sent from the right side of FIG. 3B to the condenser 25 and radiator 26. Since this is the wind tunnel test, by closing the inlet on the wind sending side of the wind tunnel, the passing air volume lower than the air volume of air generated by the cooling fan 22 can be set.

In FIG. 3A, when the motor application voltage Vm becomes at high level, the motor current Im increases. When the motor application voltage Vm is controlled to be constant, as the passing air volume increases, the load on the DC motor 23 decreases and the motor current Im decreases.

Further, it is made clear by the wind tunnel test that when an air of the same volume as that determined from the characteristic diagram of FIG. 2A is forcedly sent in a state where the motor application voltage Vm is controlled to be constant, the motor current Im decreases to about 80% of the motor current ImO when the forced air volume is 0. For example, in the case where the motor application voltage Vm is constant at 6.85V, the motor current Im (=ImO) is about 9.5A when the forced air volume is 0. When the forced air volume is 2500 m³/h, the motor current Im decreases to about 8A. It shows that, in the case where the motor application voltage Vm is controlled to be constant in an actual driving state of the vehicle, when the air volume of the flowing air generated as the car travels becomes equal to the above-described required cooling air volume, the motor current Im decreases to 80% of the motor current ImO flowing when the vehicle stops.

The broken line shown in FIG. 3A is obtained by connecting the points of the motor current Im which decreases to 80% of the motor current ImO with respect to the motor application voltage Vm. That is, the area on the right side of the broken line is an area in which the air volume of the flowing air is higher than the required cooling air volume. The motor current Im in the area satisfies the following conditional expression with respect to the motor current Im0 when the vehicle stops.

$$Im \leq 0.8 \times ImO \quad (1)$$

When the relation of the expression (1) is satisfied, therefore, even if the DC motor 23 is not driven, the required cooling air volume can be assured. Consequently, the motor control unit 24 determines whether the expression (1) is satisfied, and changes the voltage applied to the DC motor 23 according to the result of determination, thereby enabling the power consumption of the DC motor 23 to be reduced (power saving control).

Figure 4:
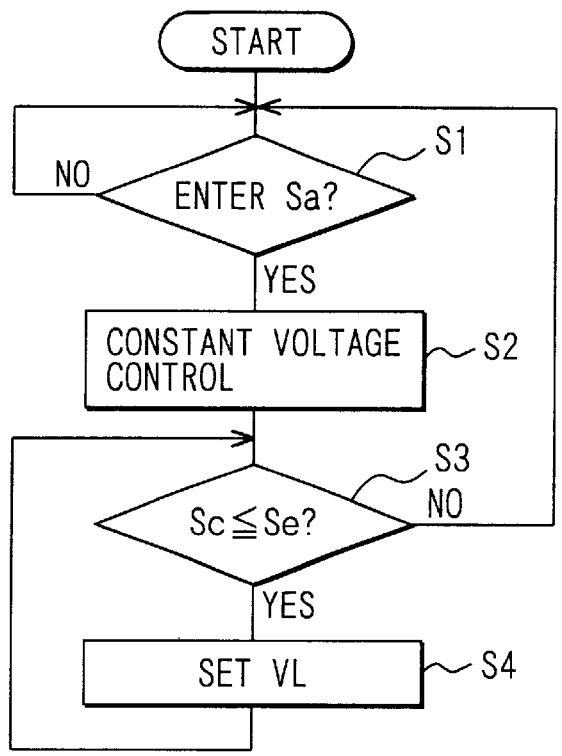
FIG. 4 is a flow chart showing a power-saving control.

FIG. 4 shows a flow chart of the power saving control executed by the motor control unit 24. In the embodiment, the whole power saving control is executed by hardware in the IC 31.

The motor control unit 24 determines whether the control signal Sa is entered from the engine control unit (step S1). When it is determined that the motor control unit 24 receives the control signal Sa ("YES"), the control signal Sa is converted to the voltage instruction signal Sb by the input processing circuit 32, and the driving circuit 33 performs the feedback control so that the motor voltage Vm coincides with the voltage instructed by the voltage instruction signal Sb (step S2 which is a constant voltage control step). On the other hand, when it is determined that the motor control unit 24 has not received the control signal Sa from the engine control unit ("NO" in step S1), the program returns to the process of step S1.

After that, in step S3 (detection step), the comparator 37 determines whether the motor current Im indicated by the current detection signal Sc decreases below the reference current indicated by the reference current signal Se. The reference current is set to the value which is 80% of the motor current ImO at the time of no wind. That is, in step S3, the comparator 37 determines whether the air volume of the passing air is equal to or more than the required cooling air volume.

Figure 5:
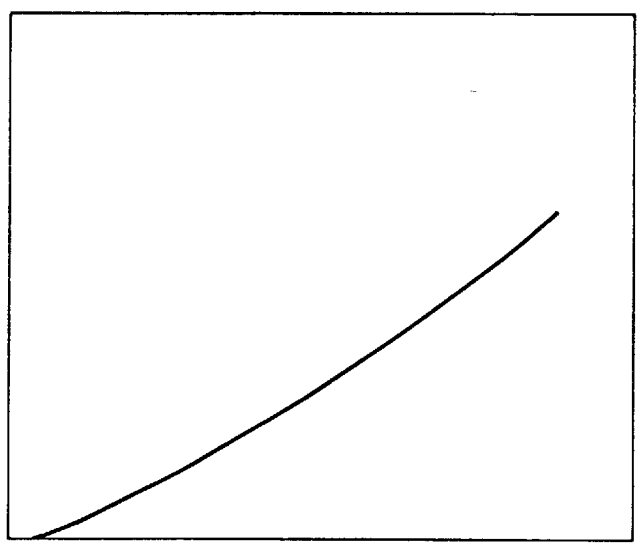
FIG. 5 is a graph showing a reference current for the motor voltage Vm.

In this case, the reference current setting circuit 36 calculates the reference current (voltage signal in the IC 31) by the following expression (2). FIG. 5 shows the reference current.

$$\text{Reference current} = 0.8 \times (A \times Vm^c + B) \quad (2)$$

where Vm denotes a motor voltage, and A, B, and C are constants determined by the DC motor 23.

When the motor current Im is not equal to or lower than the reference current in step S3 ("NO"), the motor control unit 24 shifts to the process of step S1 again. In this case, the comparator 37 outputs the switching signal Sf of the L level, so that the switching circuit 39 selects an output signal of the driving circuit 33, and the feedback control by the driving circuit 33 is performed.

On the other hand, when the motor current Im decreases to a value equal to or lower than the reference current in step S3 ("YES"), the motor control unit 24 moves to step S4 as a voltage changing step. In this case, the comparator 37 outputs the switching signal of the H level, the switching circuit 39 selects the output signal of the operational amplifier 35, and the feedback control is performed so that the motor voltage Vm coincides with the minimum application voltage VL.

Incidentally, when the DC motor 23 stops, a change in the motor current Im that is caused by the passage of the flowing air to the cooling fan 22 cannot be detected. Consequently, when the air volume of flowing air becomes equal to or higher than the required cooling air volume, the motor application voltage is not set to 0V but is set to the minimum application voltage VL (such as 2V).

Figure 6:
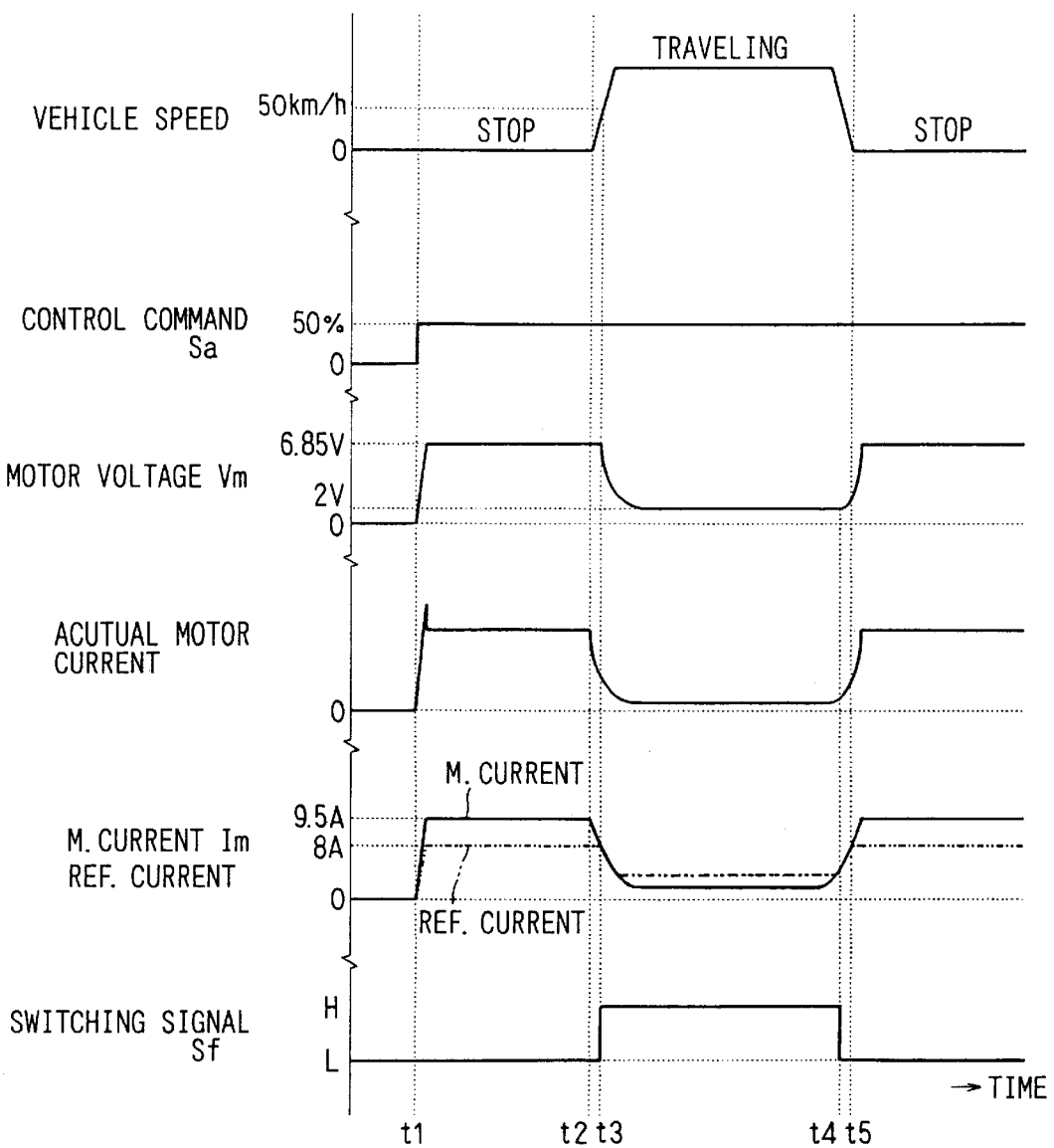
FIG. 6 is an operation waveform chart showing the power-saving control.

FIG. 6 shows an example of the operation waveforms in the power saving control. The waveforms in FIG. 6 express, according to the order from the top, vehicle speed, control instruction Sa, motor voltage Vm, actual motor current, reference current and detected motor current Im, and switching signal Sf.

At time t1 when the vehicle stops, since 2500 m³/h is necessary to cool the condenser 25 and radiator 26, the engine control unit sends the control signal Sa of 6.85V (refer to FIG. 2) as the motor application voltage according to the required cooling air volume to the motor control unit 24. In this case, since the flowing air is zero, the motor current Im is equal to 9.5A (current value when the passing air volume in FIG. 3 is zero).

When the vehicle starts to travel at time t2, the flowing air increases as the speed increases, and the motor current Im decreases. At time t3, when the vehicle speed becomes 50 km/h, 2500 m³/h as the required cooling air volume is obtained. At time t3, the motor current Im becomes equal to or lower than the reference current, so that the switching signal Sf changes from the L level to the H level. By the change of the switching signal Sf, the motor voltage Vm is controlled to become the minimum application voltage VL (2V), and the reference current is also changed accordingly. At this time, the motor current Im decreases from 8A to almost 0A, so that the motor power consumption decreases.

After that, when the vehicle decelerates, as the speed decreases, the flowing air decreases, whereby the motor current Im increases. At time t4, when the motor current Im becomes higher than the reference current, the switching signal Sf changes from the H level to the L level, and the motor application voltage is controlled again to 6.85V instructed as the control signal Sa.

As described above, the fan control system 21 of the embodiment has current detecting means including the resistor 29 and the detection voltage processing circuit 30, and can indirectly detect the air volume of the flowing air passing through the condenser 25 and radiator 26 on the basis of the motor current Im. The fan control system 21 sets, as the reference current, the motor current Im which flows when the flowing air reaches at the required air volume to cool the condenser 25 and the radiator 26. When the motor current Im decreases equal to or lower than the reference current, that is, when the required air volume can be assured only by the flowing air, the voltage changing operation is performed so as to decrease the motor voltage Vm. Consequently, the motor power consumption can be reduced in the state where the required cooling air volume is assured, so that the power of the battery 27 can be saved.

Even when the motor current Im decreases equal to or lower than the reference current, the minimum application voltage VL is applied to the DC motor 23 so as not to stop the rotation of the cooling fan 22. Consequently, even after the application voltage is once changed, the flowing air can be detected, and the application voltage can be changed as necessary.

In the embodiment, it is detected whether the necessary cooling air volume is obtained by the flowing air flowing when the vehicle travels from the relation between the motor application voltage and the current flowing the motor. Consequently, as compared with the case of controlling a fan motor by using a vehicle speed signal, the power saving control can be performed preferably. The air volume of the cooling air generated by the fan provided on the downstream side of a heat exchanger (the radiator or the like) is estimated on the basis of the air volume of the air passed through the heat exchanger. Consequently, even if clogging or the like occurs in the heat exchanger, the fan control can be performed according to the clogging state. Although the heat exchanging efficiency by the flowing air changes according to the shape of the front of the vehicle, the air volume of the air passed through the heat exchanger is directly estimated in the foregoing embodiment, so that optimum design does not have to be made according to the shape of the front. Consequently, the fan control system described in the embodiment can be adopted various kinds of car.

The invention is not limited to the above-described embodiment shown in the drawings but can be also modified or extended as follows, for example.

The motor is not limited to the DC motor 23 but may be, for example, a brushless motor.

When a simple expression that the reference current=0.8× D×Vm (where D is a constant) can be employed in place of the expression (2), a large error does not occur.

The driving circuit 33 may be constructed so as to perform a PWM control.

Moreover, in the motor control unit 24, although such elements as the reference current setting circuit 36, the driving circuit 33, the detection voltage processing circuit 30 or the like are integrated in the IC 31, these elements may be discrete elements, respectively.

While the present invention has been shown and described with reference to the foregoing preferred embodiment, it will be apparent to those skilled in the art that changes in form and detail may be therein without departing from the scope of the invention as defined in the appended claims.

What is claimed is:

1. An apparatus for controlling a cooling fan for a vehicle, comprising:
    a motor for rotating the cooling fan for a vehicle; and
    control means for controlling a voltage applied to the motor,
    wherein when a current flowing the motor decreases in a state where the voltage applied to the motor is controlled to be a predetermined voltage, the control means changes the voltage applied to the motor so as to be lower than the predetermined voltage.

2. An apparatus for controlling a cooling fan for a vehicle according to claim 1, wherein in the state where the voltage applied to the motor is controlled to be a predetermined voltage, when the current flowing the motor becomes lower than a current flowing the motor at a time when the vehicle stops, by a predetermined amount, the control means changes the voltage applied to the motor.

3. An apparatus for controlling a cooling fan for a vehicle according to claim 2, the predetermined amount is set to be equal to a decrease amount of the current flowing the motor in a case where same air volume as that of air generated by the cooling fan when the vehicle stops is given to the cooling fan.

4. An apparatus for controlling a cooling fan for a vehicle according to claim 1, wherein when the current flowing the motor decreases in the state where the voltage applied to the motor is controlled to be the predetermined voltage, the control means stops current from flowing through the motor.

5. An apparatus for controlling a cooling fan for a vehicle according to claim 1, wherein when the current flowing the motor decreases in the state where the voltage applied to the motor is controlled to be the predetermined voltage, the control means sets the voltage applied to the motor to a voltage lower than the predetermined voltage, with which the motor can keep running.

6. An apparatus for controlling a cooling fan for a vehicle according to claim 1, wherein when the current flowing the motor increases in a state where the voltage applied to the motor is controlled to be the predetermined voltage, the control means increase the voltage applied to the motor.

7. An apparatus for controlling a cooling fan for a vehicle, comprising:
    a motor for rotating the cooling fan for a vehicle; and
    control means for controlling a voltage applied to the motor,
    wherein the control means comprises:
        voltage applying means for applying a voltage to the motor;
        voltage detecting means for detecting the voltage applied to the motor;
        current detecting means for detecting a current flowing the motor;
        current change detecting means for outputting a current decrease signal when the current flowing the motor detected by the current detecting means becomes lower than a threshold determined by the voltage applied to the motor; and
        voltage control means for controlling the voltage applying means so that a predetermined voltage indicated from an outside of the control means is used as an instruction voltage when the current decrease signal is not output, a voltage lower than the predetermined voltage is used as the instruction voltage when the current decrease signal is output, and the voltage applied to the motor detected by the voltage detecting means coincides with the instruction voltage.

8. An apparatus for controlling a cooling fan for a vehicle according to claim 7, wherein in a state where the voltage control means controls the voltage applying means by using the predetermined voltage as the instruction voltage, the threshold is set to be equal to a value of the current flowing the motor in a case where same air volume as that of air obtained by the cooling fan for vehicle when the vehicle stops is given to the cooling fan for vehicle.

9. An apparatus for controlling a cooling fan for a vehicle according to claim 8, wherein the voltage control means sets the instruction voltage to 0V when the current decrease signal is output.

10. An apparatus for controlling a cooling fan for a vehicle according to claim 7, wherein the voltage control means sets, as the instruction voltage, a voltage at a degree that the motor can keep running when the current decrease signal is output.

11. A method of controlling a motor-driven cooling fan for a vehicle, comprising:

a constant voltage control step of controlling a voltage applied to the motor so as to be a predetermined voltage;

a detecting step of detecting whether a current flowing the motor has decreased in a state where the voltage applied to the motor is controlled to be the predetermined voltage; and a voltage changing step of controlling the voltage applied to the motor so as to be lower than the predetermined voltage when decrease in the current flowing the motor is detected in the detecting step.

12. A method for controlling a cooling fan for a vehicle according to claim 11, wherein in the detecting step, whether the current flowing the motor has been decreased or increased is detected in the state where the voltage applied to the motor is controlled to be the predetermined voltage, and when increase in the current flowing the motor is detected in the detecting step, the voltage applied to the motor is increased.

* * * * *